(12) United States Patent
Geus et al.

(10) Patent No.: US 7,291,320 B2
(45) Date of Patent: Nov. 6, 2007

(54) PROCESS FOR THE SELECTIVE OXIDATION OF HYDROGEN SULFHIDE

(75) Inventors: John Wilhelm Geus, Amsterdam (NL); Carolus Matthias Anna Maria Mesters, Amsterdam (NL); Ronald Jan Schoonebeek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 482 days.

(21) Appl. No.: 10/954,043

(22) Filed: Sep. 29, 2004

(65) Prior Publication Data

US 2005/0100504 A1 May 12, 2005

(30) Foreign Application Priority Data

Sep. 29, 2003 (EP) .................................. 03256105

(51) Int. Cl.
*C01B 17/04* (2006.01)
(52) U.S. Cl. ............... 423/573.1; 423/576.2; 423/576.8
(58) Field of Classification Search .......... 423/573.1, 423/576.2, 576.8
See application file for complete search history.

(56) References Cited

U.S. PATENT DOCUMENTS

| | | | |
|---|---|---|---|
| 4,311,683 A | 1/1982 | Hass et al. | |
| 4,487,753 A * | 12/1984 | Massie et al. | 423/576.6 |
| 4,632,818 A * | 12/1986 | Chen et al. | 423/574.1 |
| 4,640,908 A | 2/1987 | Dupin | 502/243 |
| 4,886,649 A | 12/1989 | Ismagilov et al. | 423/230 |
| 6,083,473 A | 7/2000 | Esquivel et al. | 423/576.8 |
| 6,207,127 B1 | 3/2001 | Geus et al. | 423/573.1 |
| 6,235,259 B1 | 5/2001 | Ledoux et al. | 423/573.1 |
| 6,403,051 B1 * | 6/2002 | Keller | 423/573.1 |

FOREIGN PATENT DOCUMENTS

| | | |
|---|---|---|
| EP | 242920 | 10/1987 |
| EP | 409353 | 7/1990 |

OTHER PUBLICATIONS

R. F. Bacon and F. Fanelli, J.Am. Chem. Soc 65 (1943)639.
Touro et al. J. Phys. Chem. 70 (1966)239).

* cited by examiner

*Primary Examiner*—Timothy C. Vanoy
(74) *Attorney, Agent, or Firm*—Charles W. Stewart

(57) ABSTRACT

A process for the selective oxidation of hydrogen sulphide in a hydrogen sulphide containing feed gas to elemental sulphur, wherein the hydrogen sulphide containing feed gas (3), an inert liquid medium (5), and a molecular-oxygen containing gas (4) are supplied to a reaction zone (1) comprising at least one catalytic zone (2) comprising an oxidation catalyst to form elemental sulphur and a gaseous stream depleted in hydrogen sulphide (8), in which process the oxidation catalyst of each catalytic zone (2) is contacted with hydrogen sulphide and/or molecular-oxygen in the presence of inert liquid medium at a temperature in the range of from 120 to 160° C., under such conditions that the elemental sulphur formed is essentially in liquid form and is removed from the reaction zone with the inert liquid medium.

24 Claims, 4 Drawing Sheets

PROCESS FOR THE SELECTIVE OXIDATION OF HYDROGEN SULFHIDE

FIELD OF THE INVENTION

The invention relates to a process for the selective oxidation of hydrogen sulphide in a hydrogen sulphide containing feed gas to elemental sulphur.

BACKGROUND OF THE INVENTION

A known industrial process for the conversion of hydrogen sulphide separated from a gas stream is the so-called Claus process. Hydrogen sulphide is first separated from the remainder of the gas stream by a solvent extraction process. After solvent regeneration, a low-pressure $H_2S$-rich gas is obtained which is dealt with in the Claus process. About one third of the hydrogen sulphide in this gas is oxidized with air to sulphur dioxide in a burner, according to:

$$2H_2S + 3O_2 \Rightarrow 2H_2O + 2SO_2 \quad (1)$$

The sulphur dioxide subsequently reacts with the remaining hydrogen sulphide to elemental sulphur according to the Claus reaction:

$$2H_2S + SO_2 \Leftrightarrow 2H_2O + 3/n S_n \quad (2)$$

The $H_2S$ conversion is about 70%. In order to achieve a $H_2S$ conversion of more than 70%, several catalytic Claus reaction steps at a temperature above about 200° C. are needed and sulphur has to be condensed in between the reaction steps. Due to thermodynamic limitations, the $H_2S$ conversion of the Claus process is at most 97%. The remaining hydrogen sulphide is incinerated to sulphur dioxide or treated in a Claus tail gas treating process, such as the SuperClaus process or the Shell Claus Offgas Treating (SCOT) process.

Disadvantages of the Claus process are that several reaction steps are needed, the overall $H_2S$ conversion is at most 97%, and the reaction rate is low, due to the low pressure of the reactant gas. Moreover, the hydrogen sulphide has first to be separated from the remainder of the gas. It would be advantageous if hydrogen sulphide could be selectively oxidized, i.e. without the need to separate it from the remainder of the gas.

In U.S. Pat. No. 4,886,649 a process for the selective oxidation of hydrogen sulphide to elemental sulphur in a hydro carbonaceous gas is disclosed. $H_2S$ is oxidized according to the following reaction:

$$2H_2S + O_2 \Rightarrow 2H_2O + 2/n S_n \quad (3)$$

The reaction (3) is performed in two stages in U.S. Pat. No. 4,886,649. Oxidation within the first stage is carried out in a fluidised bed of a granular catalyst containing 10-20% by mass of magnesium chromate on aluminium oxide at temperatures between 250-350° C. In the second oxidation stage, the unreacted hydrogen sulphide and oxygen from the first stage are reacted at 140-155° C. in the presence of a catalyst containing vanadium pentoxide and aluminium oxide.

A disadvantage of the process of U.S. Pat. No. 4,886,649 is that gaseous sulphur is formed in the first stage. At the concentrations wherein sulphur is present in the gaseous effluent of the first stage, this will inevitably result in the formation of a sulphur mist, which is difficult to separate from the gas flow and results in deposition of elemental sulphur on the catalyst, reactor elements or conduits.

Another disadvantage is that some sulphur dioxide will be formed at the process temperature of the first step.

In U.S. Pat. No. 4,311,683 is disclosed a process for the removal of hydrogen sulphide from a feed gas, and the production of sulphur therefrom, by selective oxidation of the $H_2S$ with oxygen. The feed gas stream comprising $H_2S$ and oxygen is passed through a catalyst bed under conditions such that the hydrogen sulphide and oxygen react to produce elemental sulphur vapour. The inlet temperature into the catalyst bed is between about 250° and 450° F. (121° and 232° C.). In the examples, this temperature is at least 325° F. (163° C.). The catalyst is an oxidation catalyst comprising an oxide and/or sulphide of vanadium supported on a non-alkaline porous refractory oxide. It is mentioned that sulphur deposition and consequent catalyst deactivation are prevented by maintaining the partial pressure of free sulphur in the oxidation reactor below that necessary for condensation. Preferably, the temperature is maintained below 450° F. (232° C.) and the $H_2S$ concentration in the feed is kept low by diluting the feed with an inert gas or with recycle gases.

In U.S. Pat. No. 6,207,127 is disclosed a method for making a catalyst for the selective oxidation of hydrogen sulphide into elemental sulphur. The catalyst comprises a mixed oxide of iron and zinc on a silica support. The catalyst is used in a selective oxidation process in an adiabatically operating reactor wherein the inlet temperature of the catalyst bed is at least 150° C., preferably at least 170° C., i.e. above the dew point of the sulphur formed.

In the processes of U.S. Pat. No. 4,311,683 and U.S. Pat. No. 6,207,127, sulphur is kept in the vapour phase by performing the selective oxidation at temperatures above about 160° C. and by keeping the sulphur concentration very low. This means that these processes are not suitable for deep desulphurisation of gases having a high content of hydrogen sulphide, since this would inevitably lead to sulphur deposition.

There is a need in the art for a process for the direct selective oxidation of hydrogen sulphide, that is suitable for the deep desulphurisation of gaseous streams with a relatively high $H_2S$ content, i.e. above 0.5 vol % and up to 25-50 vol %, wherein deposition of solid or polymerized sulphur on reactor elements, conduits or the catalyst is prevented and wherein the formation of sulphur dioxide is minimized.

SUMMARY OF THE INVENTION

It has now been found that the above can be achieved by performing the catalytic selective oxidation in the presence of an inert liquid medium at a temperature in the range of from 120 to 160° C. such that the sulphur formed is essentially in liquid form and can be removed from the catalyst with the inert liquid medium.

Accordingly, the invention is directed to a process for the selective oxidation of hydrogen sulphide in a hydrogen sulphide containing feed gas to elemental sulphur, wherein the hydrogen sulphide containing feed gas, an inert liquid medium, and a molecular-oxygen containing gas are supplied to a reaction zone comprising at least one catalytic zone comprising an oxidation catalyst to form elemental sulphur and a gaseous stream depleted in hydrogen sulphide, in which process the oxidation catalyst of each catalytic zone is contacted with hydrogen sulphide and/or molecular-oxygen in the presence of inert liquid medium at a temperature in the range of from 120 to 160° C., under such conditions that the elemental sulphur formed is essentially in liquid form and is removed from the reaction zone with the inert liquid medium.

In the process according to the invention hydrogen sulphide is selectively oxidized to sulphur according to exothermic reaction (3). The reaction is selective in the sense that compounds other than $H_2S$, such as hydrocarbons or hydrogen, are not or hardly oxidized. This has the advantage that there is no need to separate $H_2S$ from the other gas components, such as in the Claus process.

Another advantage of the process according to the invention is that no or hardly any sulphur dioxide is formed. The hydrogen sulphide is selectively oxidized to elemental sulphur.

In the process of the invention, not only the reactants, i.e. a hydrogen sulphide containing feed gas and a molecular-oxygen containing gas, are supplied to a reaction zone comprising a catalyst for selective oxidation, but also an inert liquid medium. The inert liquid medium serves a dual purpose. Firstly, the inert liquid medium absorbs heat that is released due to the exothermicity of the oxidation reaction and thus helps maintaining the temperature of the catalytic zone in the range where sulphur is essentially in liquid form, i.e. between 120 and 160° C. Secondly, it removes the liquid sulphur formed from the oxidation catalyst.

To form sulphur in liquid form that can easily be removed from the catalytic zone, the temperature of the catalytic zone has to be above the melting temperature of sulphur. The melting temperature of elemental sulphur is 112-120° C., the exact value depending on the crystal structure of the sulphur (CRC Handbook of Chemistry and Physics, 56th edition, 1975-1976). Therefore, the process temperature in the at least one catalytic zone is at least 120° C.

At a temperature of about 159° C., elemental sulphur starts to polymerize and forms a substance of a high viscosity that is difficult to remove from the pores or from the surface of a catalyst and may result in clogging and deactivation of the catalyst. It is known in the art, from for example Bacon et al. (R. F. Bacon and F. Fanelli, J. Am. Chem. Soc. 65 (1943) 639) and Touro et al. (J. Phys. Chem. 70 (1966) 239) that the presence of hydrogen sulphide influences the viscosity of sulphur. Thus, the exact viscosity increase with temperature will inter alia depend on the hydrogen sulphide concentration. The viscosity increase of liquid sulphur with temperature is significantly reduced in the presence of $H_2S$.

In the process according to the invention, the sulphur formed is essentially in liquid form. Essentially in liquid form means that the degree of sulphur polymerization is limited to the extent that the sulphur can still be removed from the reaction zone with the inert liquid medium, such that there is no build-up of sulphur on the catalyst to the extent that sulphur prohibits access of the reactants to the catalytically active sites. Therefore, the temperature in the at least one catalytic zone is at most 160° C.

BRIEF DESCRIPTION OF THE DRAWINGS

Four embodiments of the invention are described in detail and by way of example with reference to FIGS. 1 to 4.

DETAILED DESCRIPTION OF THE INVENTION

Figure 1:
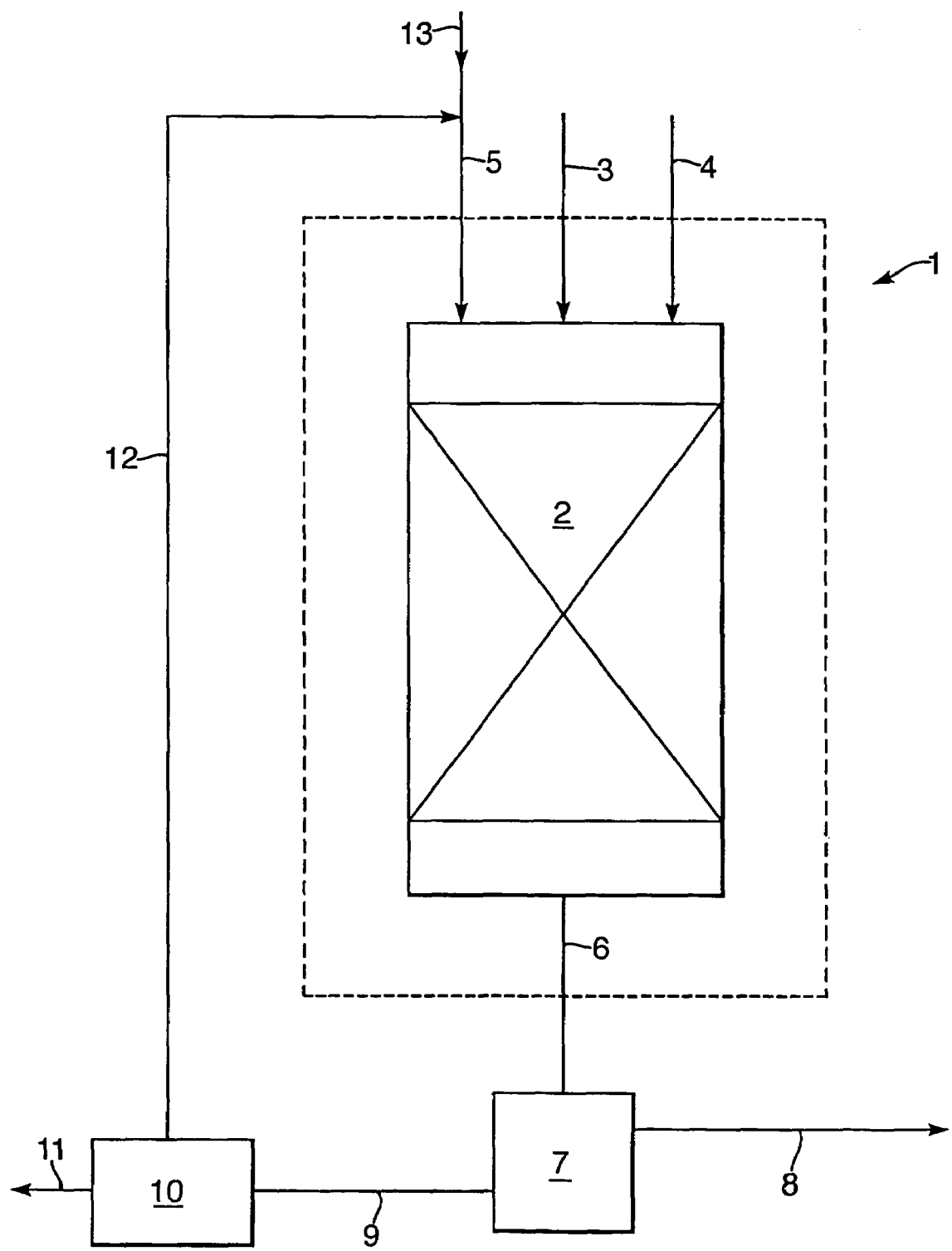
In FIG. 1 a process scheme of a first embodiment wherein the reaction zone has a single catalytic zone is shown.

In the process according to the invention, hydrogen sulphide containing feed gas, molecular oxygen-containing gas and an inert liquid medium are supplied to a reaction zone comprising at least one catalytic zone comprising an oxidation catalyst.

The oxidation catalyst may be any oxidation catalyst suitable for the selective oxidation of hydrogen sulphide. Such oxidation catalysts are known in the art and typically comprise an oxide and/or a sulphide compound of one or more metals. Reference herein to an oxide compound of one or more metals is to a compound of the approximate general formula $MS_{x-1}O_y$, wherein M is one or more metals, and x and y have, independently, a numberic value of at least 1. Reference herein to a sulphide compound of one or more metals is to a compound of the approximate general formula $MS_xO_{y-1}$. When contacted with hydrogen sulphide, the metal oxide compound will be converted to a metal sulphide compound and water is formed. When the thus-formed metal sulphide compound is then contacted with oxygen, it is converted into the metal oxide compound and elemental sulphur is formed. These two subsequent reactions are symbolically represented by the following equations:

$$MS_{x-1}O_y + H_2S \rightarrow MS_xO_{y-1} + H_2O \qquad (3a)$$

$$MS_xO_{y-1} + \tfrac{1}{2}O_2 \rightarrow MS_{x-1}O_y + S \qquad (3b)$$

The overall reaction is the selective oxidation reaction according to equation (3). It will be appreciated that the oxidation catalyst thus comprises a metal compound containing oxygen and sulphur in proportion varying during the catalytic process. The compound having the highest proportion of oxygen is represented as $MS_xO_{y-1}$ in equations (3a) and (3b) and referred to as oxide. The compound having the highest proportion of sulphur is represented as $MS_{x-1}O_y$ and referred to as sulphide.

In some embodiments of the process according to the invention, the reaction zone comprises one or more catalytic zones wherein both reactions (3a) and (3b) take place in each catalytic zone. In these embodiments, both hydrogen sulphide and molecular oxygen are supplied to each catalytic zone. In each catalytic zone, the catalytically-active compounds of the oxidation catalyst, i.e. the oxide or sulphide compounds of a metal, will alternately be in its oxide ($MS_{x-1}O_y$) and sulphide ($MS_xO_{y-1}$) form.

In alternative embodiments of the process of the invention, reaction (3a) takes place in one catalytic zone and reaction (3b) takes place in a different catalytic zone. It will be appreciated that in these alternative embodiments, the oxidation catalyst can be considered as a regenerable adsorbent. The hydrogen sulphide containing feed gas is then supplied to the catalytic zone where reaction (3a) takes place and the molecular-oxygen containing gas is then supplied to the catalytic zone where reaction (3b) takes place. During the process, the oxidation catalyst in the zone wherein reaction (3a) takes place will be converted from its oxide form ($MS_{x-1}O_y$) into its sulphide form ($MS_xO_{y-1}$) and the oxidation catalyst in the zone wherein reaction (3b) takes place will be converted from its sulphide form into its oxide form.

In all embodiments of the invention, the supply of inert liquid medium to the reaction zone is such that inert liquid medium is supplied to each catalytic zone and thus in each zone, the reaction (according to equations (3a) and/or (3b)) takes place in the presence of inert liquid medium.

In a first embodiment of the process according to the invention, the reaction zone comprises a single catalytic zone of oxidation catalyst and the hydrogen sulphide containing feed gas, the molecular-containing gas and the liquid inert medium are supplied to that single catalytic zone. This embodiment is further illustrated in FIG. 1.

In this first embodiment, hydrogen sulphide and oxygen are contacted with the oxidation catalyst in the presence of the inert liquid medium. The temperature of the catalytic zone is maintained in the range of from 120-160° C. The heat released by the exothermic oxidation reaction is at least partly absorbed by the inert liquid medium. Due to the heat absorption by the inert liquid medium and, optionally, by additional cooling means, the temperature in the catalytic zone is kept below the temperature at which a significant viscosity increase due to sulphur polymerization takes place, i.e. below about 160° C.

A gas-liquid mixture comprising a gaseous stream depleted in hydrogen sulphide and inert liquid medium with the sulphur formed dissolved in it, mixed with it or finely dispersed in it, is removed from the catalytic zone. The gas and liquid are separated into a gaseous stream depleted in hydrogen sulphide and a liquid stream comprising the liquid inert medium and sulphur. The liquid stream may comprise more than one liquid phase, for example a phase of inert liquid and a separate phase of liquid sulphur and/or water.

The gaseous stream may optionally be further treated to remove components like residual water, oxygen, COS and/or hydrogen sulphide by means known in the art.

The inert liquid medium is preferably recycled to the catalytic zone. In case that the inert liquid medium is not liquid sulphur, at least part of the sulphur is preferably removed from the inert liquid medium before recycling it. In that case, the greater part of the sulphur may be separated from the liquid stream by phase separation.

The reaction zone of the process according to the invention may comprise two or more catalytic zones of oxidation catalyst in series. Both reactions (3a) and (3b) then take place in each catalytic zone and hydrogen sulphide and oxygen are supplied to and contacted with the oxidation catalyst of each catalytic zone.

The use of several catalytic zones in series is advantageous in the case of a feed gas having a high content of hydrogen sulphide. In that case, several catalytic zones in series can provide for the possibilities of interstage cooling, interstage water separation, staged supply of feed gas or of molecular-oxygen containing gas or a combination of two or more thereof.

In the case of several catalytic zones in series, at least part of the hydrogen sulphide containing feed gas, at least part of the oxygen-containing gas and inert liquid medium are supplied to the first, i.e. the most upstream, catalytic zone, which is operated as hereinbefore described for the first embodiment.

Figure 2:
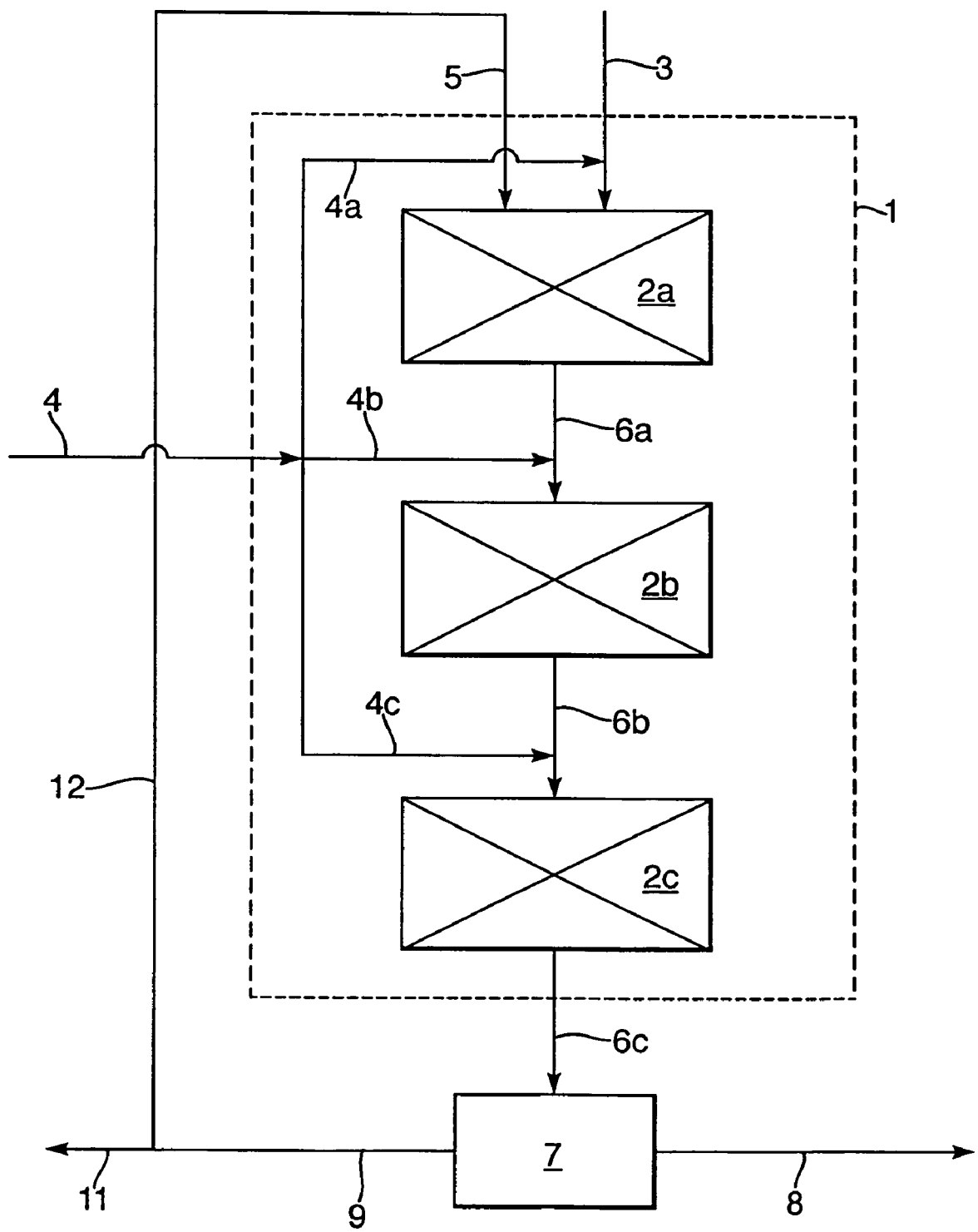
In FIG. 2 is shown a process scheme of a second embodiment of the invention wherein the reaction zone has three catalytic zones in series with staged feed of the molecular-oxygen containing gas, and wherein liquid sulphur is used as inert liquid medium.

Preferably, the effluent of the first catalytic zone, i.e. a mixture of $H_2S$ depleted gas, inert liquid medium and sulphur is sent to the second catalytic zone, optionally after cooling. The remainder of the feed gas and/or molecular-oxygen containing gas is then supplied to the second catalytic zone. It will be appreciated that if there are more than two catalytic zones, the remainder of the feed gas and/or molecular-oxygen containing gas may be divided over the second and further downstream catalytic zones. The effluent of the most downstream catalytic zone will be separated into a gaseous stream of hydrogen sulphide depleted gas and a liquid stream comprising inert liquid medium and sulphur. The inert liquid medium is preferably recycled to the first catalytic zone, typically after sulphur removal. In FIG. 2, an embodiment of the invention with three catalytic zones in series with staged supply of oxygen-containing gas is illustrated.

It is possible to separate the effluent from each catalytic zone into gas and liquid and to recycle the inert liquid medium to that catalytic zone. In that case, new inert liquid medium has to be supplied to the next downstream catalytic zone.

In the case of a very high $H_2S$ content of the feed gas, it might be advantageous to apply inter-stage water separation by separating an inter-stage effluent into its gaseous and liquid part and condense water from the gaseous part before it is supplied to the next downstream catalytic zone. Inter-stage water separation is preferably applied in combination with staged supply of the molecular-oxygen containing gas and/or feed gas.

Figure 3:
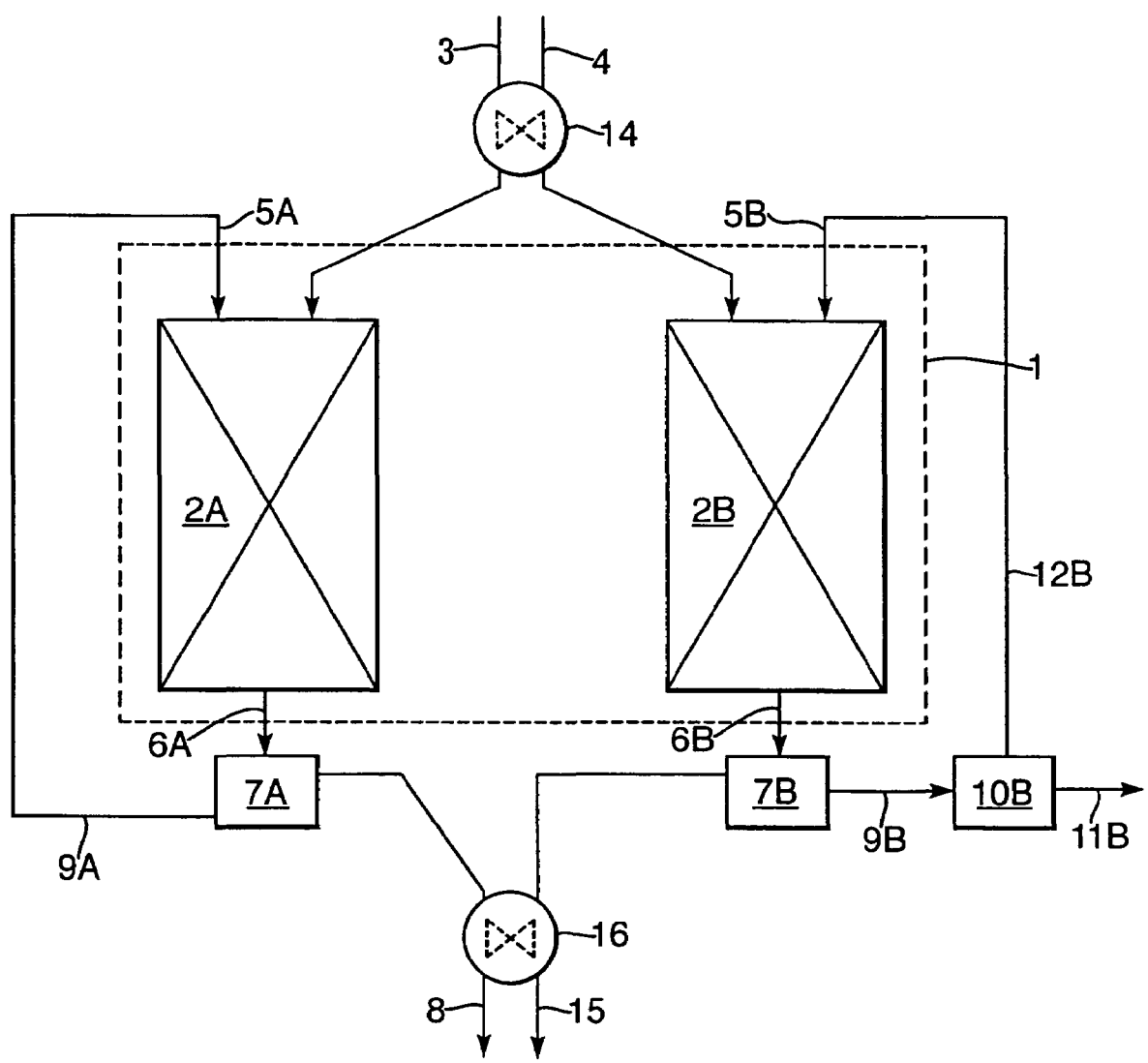
In FIG. 3 is shown a process scheme of a third embodiment wherein the process is performed in swing mode operation in a reaction zone comprising two separate fixed bed catalytic zones, and wherein liquid sulphur is used as inert liquid medium.
Figure 4:
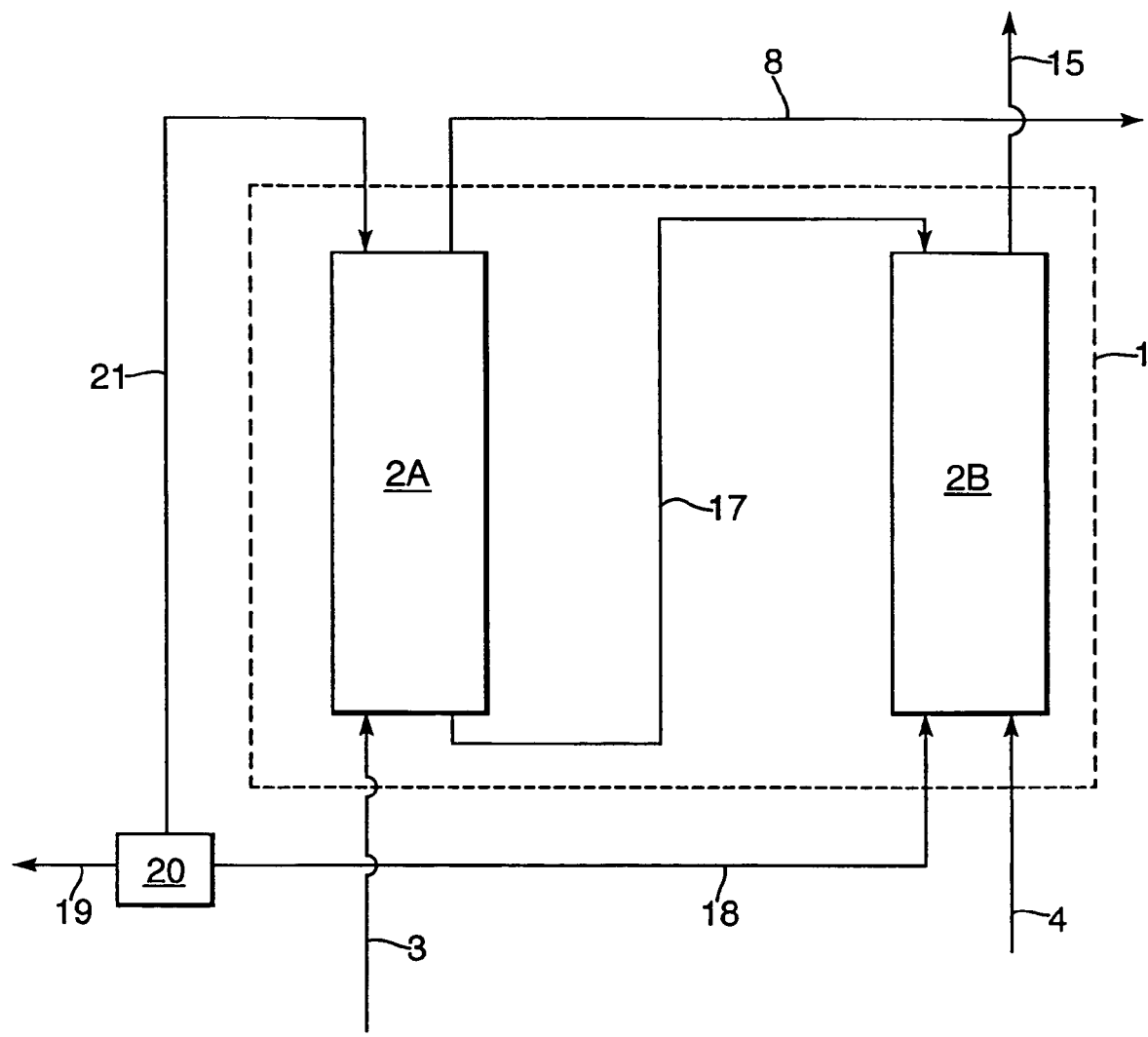
In FIG. 4 is shown a process scheme of a fourth embodiment wherein the process is performed in two stages in two separate slurry bubble columns, and wherein liquid sulphur is used as inert liquid medium.

In the case of a very high content of hydrogen sulphide in the feed gas, it may be advantageous to perform the process in such way that reactions (3a) and (3b) are carried out in separate catalytic zones. In this way, air can be used as molecular-oxygen containing gas, without diluting the treated feed gas with nitrogen. Such embodiments are illustrated in FIGS. 3 and 4.

If the reactions (3a) and (3b) are carried out in separate catalytic zones, the reaction zone comprises catalytic zone A and catalytic zone B, both zones comprising an oxidation catalyst comprising an oxide and/or sulphide compound of one or more metals. The oxidation catalyst in zone A comprises the oxide compound and the oxidation catalyst of zone B comprises the sulphide compound of the metal(s). The hydrogen sulphide containing feed gas and inert liquid medium are supplied to catalytic zone A and contacted with the oxidation catalyst of zone A to convert the metal oxide compound into its sulphide and to form a gaseous stream depleted in hydrogen sulphide. Air and inert liquid medium are supplied to catalytic zone B and contacted with the oxidation catalyst of zone B to convert the metal sulphide compound into its oxide and to form elemental sulphur.

A gaseous stream depleted in hydrogen sulphide and a liquid stream comprising the inert liquid medium are separately recovered from zone A. The gaseous stream may be further treated to remove water, remaining hydrogen sulphide or COS as has been described hereinabove for the first embodiment. The inert liquid medium recovered from zone A is preferably recycled to zone A or supplied to zone B. From zone B, a gaseous stream of depleted air and a liquid stream comprising inert liquid medium and sulphur are separately recovered. The inert liquid medium recovered from zone B is preferably recycled to zone B or supplied to zone A, typically after removal of at least part of the sulphur.

Preferably, the oxidation catalyst used in zone A is, when the metal oxide compound is for a substantial part converted into its sulphide, used as the oxidation catalyst in zone B and vice versa, i.e. the oxidation catalyst used in zone B is, when the metal sulphide compound is for a substantial part converted into its oxide, used as the oxidation catalyst in zone A. In the case that the catalytic zones each comprise a fixed bed of oxidation catalyst, this is typically done in a so-called swing mode operation. Such a swing mode operation is illustrated in FIG. 3. In the case that the catalytic zones each are in the form of a slurry-bubble column comprising a slurry of particles of the oxidation catalyst in inert liquid medium, this may be done by removing slurry from zone B and, optionally after removal of sulphur, supplying it to zone A and vice versa. The slurry removed from zone B comprises catalyst particles comprising a metal oxide compound, inert liquid medium, and liquid sulphur. In order to prevent build-up of sulphur, preferably at least part of the sulphur is removed from the slurry before it is supplied to zone A. The slurry removed from zone A comprises catalyst particles comprising a metal sulphide compound and inert liquid medium. In FIG. 4, such an embodiment of the process, with sulphur as inert liquid medium, is illustrated.

The process according to the present invention is very suitably for the removal of $H_2S$ from gaseous streams having a relatively high content of $H_2S$, i.e. up to 50 volume %. Preferably, the hydrogen sulphide containing feed gas comprises hydrogen sulphide in the concentration of from 0.5 to 50 volume %, more preferably of from 1 to 25 volume %.

The hydrogen sulphide containing feed gas is preferably supplied to one or more of the catalytic zones in the reaction zone at a gas hourly velocity in the range of from 100 to 10,000 Nl/kg/h (normal litres of gas per kilogram of catalyst in that zone per hour), more preferably of from 200 to 5,000 Nl/kg/h. Reference herein to normal litres is to litres of gas at conditions of Standard Temperature and Pressure, i.e. 0° C. and 1 atmosphere.

The amount of inert liquid medium supplied to a catalytic zone is preferably such that the ratio of gas-to-liquid supplied to that zone is in the range of from 10 to 10,000 Nl gas/kg liquid, more preferably of from 20 to 2,000 Nl gas/kg liquid. It will be appreciated that the exact gas-to-liquid ratio mainly depends on the amount of hydrogen sulphide that is to be oxidized in that catalytic zone, since the inert liquid has the function to absorb the reaction heat in order to keep the reaction temperature of that zone below the temperature at which a significant viscosity increase due to sulphur polymerization takes place, i.e. below 160° C.

In those embodiments wherein reactions (3a) and (3b) take place in separate catalytic zones, the catalytic zone wherein reaction (3a) takes place, i.e. catalytic zone A, is also supplied with inert liquid medium in order to absorb the heat of exothermic reaction (3a). In the preferred embodiment wherein the inert liquid medium is sulphur, the inert liquid medium has also in zone A the function to keep the sulphur liquid and to remove it from zone A.

If the feed gas has a very high $H_2S$ content, for example above 10%, it might be preferred to apply additional cooling of the reaction zone, i.e. additional to the cooling effected by the supply of inert liquid medium. Additional cooling may for example be achieved by using a catalytic zone in the form of a multitubular reactor with a fixed bed of oxidation catalyst particles inside the tubes or on the shell side of the tubes and supplying coolant to the other side of the tubes. In a slurry bubble column, additional cooling may be achieved by providing the bubble column with cooling coils.

The hydrogen sulphide containing feed gas and the inert liquid medium will typically be supplied separately to the reaction zone. Alternatively, the hydrogen sulphide containing feed gas may be contacted with the inert liquid medium before they are supplied to the reaction zone. In that case, part or all of the hydrogen sulphide may be dissolved in the inert liquid medium that is supplied to the reaction zone.

The inert liquid medium may be any liquid medium that is not substantially consumed under the process conditions and that does not substantially degrade the oxidation catalyst. At least part of the inert liquid medium should be in liquid form at the process conditions in order to be able to control the process temperature and to remove the sulphur formed from the reaction zone. The inert liquid medium may be a reaction product of the selective oxidation reaction (3), i.e. water or liquid sulphur. The inert liquid medium may also be another liquid compound that is not substantially consumed under the process conditions. Examples of such liquids are paraffins like n-pentane, n-hexane, n-heptane, n-octane and mixtures thereof, refinery hydrocarbon streams such as naphtha or kerosine, crude oil, toluene, alkanol amines and Sulfinol (Sulfinol is a trademark of Shell Oil Company for a sulfolane-containincg solvent used in the Sulfinol® Gas Treatment Process). The inert liquid medium is preferably elemental sulphur. Liquid sulphur is a particular suitable inert liquid medium, because it avoids the need for separation of sulphur from the inert liquid medium and the inevitable separation losses.

Suitable catalysts for the selective oxidation of hydrogen sulphide to elemental sulphur are known in the art. They are generally in the form of a refractory oxide material on which a catalytically active material has been deposited. The oxidation catalyst may comprise as catalytically active material any material that is capable of performing an oxidation reaction. Oxide and/or sulphide compounds of a metal are known to be suitable catalytically active materials for this purpose. The metal may for example be vanadium, chromium, manganese, iron, cobalt, molybdenum or combinations thereof. Examples of prior art catalysts for the selective oxidation of $H_2S$ are iron oxide-chromium oxide on silica, iron oxide-phosphorus oxide on silica, iron oxide-sodium oxide on silica (EP-A-0409353) magnesium chromite on alumina, vanadium pentoxide on alumina (U.S. Pat. No. 4,886,649) and silicon carbide supporting an active phase comprising nickel in the oxysulfide form (U.S. Pat. No. 6,235,259). Preferably, the catalytically active material is an oxide and/or sulphide compound of iron or an iron comprising mixed metal oxide and/or sulphide compound, more preferably the catalytically active material comprises a hydrated iron oxide compound.

Each catalytic zone in the reaction zone of the process according to the invention may be in any form that is suitable for a three-phase reaction system, for example a trickle flow fixed catalyst bed or a slurry bubble column.

The present invention can be used to selectively oxidize hydrogen sulphide from various gaseous streams, for example light hydrocarbons, such as methane, ethane, propane, and gases derived from such light hydrocarbons; natural gas; gases derived from tar sand and shale oils; gases associated with crude oil production; coal derived synthesis gas; gases such as hydrogen, nitrogen, carbon monoxide, carbon dioxide and mixtures thereof; steam; inert gases such as helium and argon; and product gas streams from other hydrogen sulphide removal processes that contain residual hydrogen sulphide.

The hydrogen sulphide comprising feed gas may comprise sulphur compounds such as mercaptans and COS. COS is preferably removed downstream of the process according to the invention, i.e. from the gaseous stream depleted in hydrogen sulphide that is recovered from the reaction zone. Removal of COS from gaseous streams is known in the art and is typically done by catalytic hydrolysis. It is an advantage of the process according to the invention that the gaseous stream depleted in hydrogen sulphide that is recovered comprises water. Therefore, COS hydrolysis is preferably done on that stream. Another advantage is that this stream has a very low hydrogen sulphide content. It is known that COS hydrolysis is thermodynamically limited by the presence of hydrogen sulphide.

The overall molar ratio of oxygen in the molecular-oxygen containing gas and hydrogen sulphide in the feed gas that are supplied to the reaction zone is preferably in de range of from 0.3 to 3.0, more preferably of from 0.5 to 2.0. In order to achieve deep desulphurisation, i.e. to obtain a hydrogen sulphide depleted gas having less than 1 ppmv of hydrogen sulphide, the overall molar ratio is suitably at least slightly above the stoichiometric ratio of 0.5. Thus, an oxygen-to-hydrogen sulphide ratio in the range of from 0.6 to 1.5 is particularly preferred.

If an stoichiometric excess of oxygen is used and reactions (3a) and (3b) take place in the same catalytic zone(s), the hydrogen sulphide depleted gaseous stream will comprise some oxygen. It might be preferred to remove oxygen from this gas stream. This may for example be done by leading the gas stream over an absorption bed comprising a hydrated iron sulphide compound or another metal sulphide compound that is converted to its oxide and elemental sulphur upon contacting it with oxygen. Such metal sulphide compounds that are suitable as oxygen absorbent are known in the art. When the absorbent is substantially saturated with oxygen, i.e. a substantial part of the metal sulphide compound is converted into its oxide, it will be regenerated by contacting it, preferably after vaporizing the sulphur formed, with a hydrogen sulphide containing gas. It will be appreciated that the sulphur vaporization step and the regeneration may be advantageously integrated in the process according to the invention, for example by using a hot gas stream available in the process for the vaporization and using part of the feed gas for the regeneration step.

The oxygen concentration in the molecular-oxygen containing gas is not critical. It will be appreciated that the preferred oxygen concentration depends primarily on the concentration of the hydrogen sulphide in the hydrogen sulphide containing gas. In the case of a very high content of hydrogen sulphide in the feed gas it is preferred, in order to avoid a high concentration of nitrogen or other gases in the hydrogen sulphide depleted gas, to either use substantially pure oxygen or to use air in an embodiment of the process wherein reactions (3a) and (3b) are performed in separate catalytic zones. Examples of suitable molecular-oxygen containing gases are oxygen, air or oxygen-enriched air.

In the process according to the invention, the temperature in each catalytic zone is in the range of from 120 to 160° C., preferably of from 125 to 150° C.

The process according to the present invention is preferably operated at elevated pressure, more preferably a pressure in the range of from 2 to 200 bar (absolute), even more preferably in the range of from 10 to 150 bar (absolute). Most preferably, the operating pressure is in the range of from 60 to 120 bar (absolute). In those embodiments wherein reactions (3a) and (3b) are performed in separate catalytic zones, it might be advantageous to operate catalytic zone B (reaction (3b)) at a lower pressure than catalytic zone A (reaction (3a)).

It is an advantage of the process of the invention that $H_2S$ containing gas can be processed at the pressure at which it is produced or at which it becomes available. Natural gas can for example be processed at the pressure at which it is produced at the well and effluents from a hydroprocessing or gasification unit can be processed without depressurizing them.

DETAILED DESCRIPTION OF THE DRAWINGS

In FIG. 1 is shown a reaction zone 1 having a single catalytic zone 2 in the form of a fixed bed of oxidation catalyst. A hydrogen sulphide comprising feed gas 3, a stream 4 of molecular-oxygen containing gas, and a stream 5 of inert liquid are supplied to catalytic zone 2. In catalytic zone 2, the hydrogen sulphide is selectively oxidized to liquid sulphur at a temperature in the range of from 120 to 160° C. and at elevated pressure. Effluent 6 is discharged from catalytic zone 2 and separated in gas/liquid separator 7 into a gaseous stream 8 of hydrogen sulphide depleted gas and a liquid stream 9 of inert liquid and sulphur. At least part of the sulphur is separated from liquid stream 9 in separator 10 by means of phase separation. A stream 11 of sulphur is discharged from the process and a stream 12 of inert liquid is recycled to catalytic zone 2. A small stream 13 of inert liquid is added to stream 12 to make up for losses of inert liquid in streams 8 or 11.

In FIG. 2 is shown a reaction zone 1 having three catalytic zones 2a-2c is series, wherein each zone 2a-2c is in the form of a fixed bed of oxidation catalyst. A hydrogen sulphide comprising feed gas 3, a stream 4 of molecular-oxygen containing gas, and a stream 5 of liquid sulphur as the inert liquid medium are supplied to reaction zone 1. The feed gas 3 and liquid sulphur stream 5 are, together with a part 4a of the stream 4 of molecular-oxygen containing gas, supplied to the most upstream catalytic zone 2a. A second part 4b of the stream 4 of molecular-oxygen containing gas is supplied to the second catalytic zone 2b, together with effluent 6a from zone 2a. The remainder 4c of the stream 4 of molecular-oxygen containing gas is supplied to the third catalytic zone 2c, together with effluent 6b from zone 2b.

In each catalytic zone 2a-2c, hydrogen sulphide is selectively oxidized to liquid sulphur at a temperature in the range of from 120 to 160° C. and at elevated pressure. The effluents 6a-6c each are a gas/liquid mixture. Effluent 6c is discharged from catalytic zone 2c and separated in gas/liquid separator 7 into a gaseous stream 8 of hydrogen sulphide depleted gas and a stream 9 of liquid sulphur. A stream 11 of sulphur is discharged from the process and the remainder of the sulphur is recycled to catalytic zone 2a as stream 12.

In the embodiment shown in FIG. 2, the effluents 6a and 6b are supplied to the zones 2b and 2c, respectively, without separating the gas from the liquid phase. In an alternative embodiment (not shown), the effluents 6a and 6b are separated in their gaseous and liquid phase, water is separated from the gaseous phase in a condenser, and both the dried gaseous phase and the liquid phase are supplied to zones 2b and 2c.

FIG. 3 depicts a reaction zone 1 comprising two catalytic zones 2A and 2B. Zone 2A is in the form of a fixed bed of oxidation catalyst comprising hydrated iron oxide and zone 2B is in the form of a fixed bed of oxidation catalyst comprising hydrated iron sulphide. A hydrogen sulphide comprising feed gas 3 is supplied via valve 14 to zone 2A, a stream 4 of air is supplied via valve 14 to zone 2B. A stream 5A of inert liquid medium is supplied to zone 2A and a stream 5B of inert liquid medium is supplied to zone 2B.

In zone 2A, hydrogen sulphide is contacted with the catalyst, at a temperature in the range of from 120 to 160° C. and at elevated pressure. Hydrogen sulphide is converted into water and the iron oxide is converted into iron sulphide. An effluent 6A comprising water-containing hydrogen sulphide depleted gas and inert liquid medium is removed from zone 2A and separated in gas/liquid separator 7A into a gaseous stream 8 of hydrogen sulphide depleted gas and a stream 9A of inert liquid medium. Gaseous stream 8 is discharged from the process via valve 15 and may be further treated in a gas treating unit (not shown), for example to remove water. Stream 9A of inert liquid medium is recycled to zone 2A.

In zone 2B, iron sulphide is oxidised to iron oxide and liquid sulphur is formed, also at a temperature in the range of from 120 to 160° C. and at elevated pressure. An effluent 6B is removed from zone 2B and separated in gas/liquid separator 7B into a gaseous stream 15 of oxygen-depleted air and a liquid stream 9B comprising liquid sulphur and inert liquid medium. Gaseous stream 15 is discharged from the process via valve 16. At least part of the sulphur is separated from liquid stream 9B in separator 10B by means of phase separation. A stream 11B of sulphur is discharged from the process and a stream 12B of inert liquid is recycled to catalytic zone 2B.

After some time on stream, the catalyst in zone A will comprise a substantial amount of hydrated iron sulphide and the catalyst in zone B will comprise a substantial amount of hydrated iron oxide. The supply of hydrogen sulphide comprising feed gas 3 and of air 4 to zones A and B, respectively, is then switched by switching valve 14. Thus, zone A becomes zone B and vice versa. By switching valve 16, hydrogen depleted gas 8 and oxygen-depleted air 15 are discharged from the process via the same conduits as before the swing. In new zone B (former zone A) sulphur will be separated from the liquid effluent in a separator (not shown).

In FIG. 4 is shown a reaction zone 1 comprising two catalytic zones 2A and 2B. Zone 2A is in the form of a slurry bubble column with a slurry of oxidation catalyst in liquid sulphur, the oxidation catalyst comprising iron oxide. Zone 2B is in the form of a slurry bubble column with a slurry of oxidation catalyst in liquid sulphur, the oxidation catalyst comprising iron sulphide. A hydrogen sulphide comprising feed gas 3 is supplied to zone 2A, a stream 4 of air is supplied to zone 2B.

In zone 2A, hydrogen sulphide is contacted with the catalyst particles, at a temperature in the range of from 120 to 160° C. and at elevated pressure. Hydrogen sulphide is converted into water and the iron oxide is converted into iron sulphide. A gaseous stream 8 of hydrogen sulphide depleted gas is removed from zone 2A. If desired, gaseous stream 8 may be further treated (not shown), for example to remove water. Slurry 17 comprising at least partly sulphide particles of oxidation catalyst in liquid sulphur is continually removed from zone 2A and supplied to zone 2B.

In zone 2B, iron sulphide is oxidised to iron oxide and liquid sulphur is formed, also at a temperature in the range of from 120 to 160° C. and at elevated pressure. A gaseous stream 15 of oxygen-depleted air is removed from zone 2B. Slurry 18 comprising at least partly oxidised particles of oxidation catalyst in liquid sulphur is continually removed from zone 2B. A stream 19 of sulphur is separated from slurry 18 in separator 20 and the remainder of the slurry 21 is supplied to zone 2A.

EXAMPLES

The invention will be illustrated by the following non-limiting examples.

Example 1 (Comparative)

Catalyst Preparation

Silica extrudates having a surface area of 358 m$^2$/g as measured by nitrogen adsorption (according to the BET method) and a pore volume of 1.34 ml/g as measured by mercury intrusion were provided with hydrated iron oxide. 100 grams of the silica extrudates were impregnated with 134 ml of a solution prepared from 28.6 grams of ammonium iron citrate (containing 17.5 wt % iron) and de-ionized water. The impregnated material was rotated for 90 minutes to allow equilibration. The material was subsequently dried at 60° C. for 2 hours, followed by drying at 120° C. for 2 hours and calcinations in air at 500° C. for 1 hour. The initial colour of the catalyst was black, but turned into rusty brown due to hydration of iron oxide. The resulting catalyst had a surface area of 328 m$^2$/g, a pore volume of 1.1 ml/g and an iron content of 4.7 wt % based on the total catalyst weight.

Selective Oxidation 3 grams of the catalyst prepared as described above were diluted with 0.1 mm silicon carbide particles to achieve a volume ratio of silicon carbide/catalyst particles of 1.67. This mixture was loaded into a reactor tube with an internal diameter of 10 mm, fitted with a 4 mm internal thermowell. The loaded reactor tube was mounted into a reaction system comprising an oven to preheat the feed and control the catalyst temperature. The reaction system furthermore comprised mass flow controllers (MFC) for dosing the various gases, a liquid supply system, a high-pressure gas-liquid separation vessel, a liquid level controller in combination with a valve to release the liquid effluent, a constant gas pressure valve and a wet gas meter.

At the start of the experiment, the reactor was pressurized with a flow of nitrogen to the reaction pressure of 30 bar g and the temperature was set at 135° C. The nitrogen flow was stopped and a feed gas comprising 15 vol % H$_2$S in methane and a gas comprising 4 vol % of molecular oxygen in helium were supplied to the reactor at flow rates of 3.1 and 5.9 Nl/h, respectively. Within 24 hours after start of the feed gas supply, the reactor was plugged as was evident from the absence of any gas flow. Unloading the reactor at room temperature revealed that solidified sulphur was formed, which had caused clogging of the catalyst.

Example 2 (According to the Invention)

A reactor tube was loaded with catalyst and mounted in a reactor system as described in Example 1. The reactor was pressurized to a pressure of 30 bar g using a nitrogen flow. Toluene was then supplied to the reactor tube continuously at a rate of 30 grams/hour and the temperature of the tube was set at 135° C. The nitrogen flow was stopped and a feed gas comprising 15 vol % H$_2$S in methane and a gas comprising 4 vol % of molecular oxygen in helium were mixed with the toluene stream to be supplied to the reactor tube at flow rates of 3.1 and 5.9 Nl/h, respectively, upstream of the oven.

After 48 hours at 30 bar g, the pressure was decreased to 15 bar g.

After 72 hours at 15 bar g, the pressure was increased to 90 bar g and a feed gas comprising 7 vol % H$_2$S in methane and a gas comprising 4 vol % of molecular oxygen in helium were mixed with the toluene stream to be supplied to the reactor tube at flow rates of 4.8 and 4.2 Nl/h, respectively.

After 48 hours on stream under these process conditions, pressure was decreased to 30 bar g and a feed gas comprising 15 vol % $H_2S$ in hydrogen and a gas comprising 4 vol % of molecular oxygen in helium were mixed with the toluene stream to be supplied to the reactor tube at flow rates of 3.1 and 5.9 Nl/h, respectively. These conditions were maintained during 72 hours.

During the whole experiment, gaseous and liquid effluent were continuously removed from the reactor tube.

Samples of the gaseous effluent were taken before each change in pressure or feed gas composition and at the end of he experiment. The samples were analyzed using online gas chromatography and X-ray fluorescence (XRF). The $H_2S$ and the methane conversion were calculated. The results are shown in the Table.

The experiment clearly demonstrates that high $H_2S$ conversions are achieved with the $H_2S$ comprising methane feed gases at a temperature as low as 135° C. and that the catalyst does not deactivate over time. Vapour phase analysis of the gaseous effluent showed that no other sulphur components were formed, e.g. no $SO_2$, COS, $CS_2$ or $CH_3SH$. Furthermore it is demonstrated that oxygen reacts very selectively with the $H_2S$ in that the conversion of $CH_4$ is very low.

Example 3 (According to the Invention)

Catalyst Preparation

A precipitated iron oxide on silica powder, denoted as ABS 50 with a nominal composition of 50% wt $Fe_2O_3$ and 50% wt $SiO_2$, a particle size D[v,50] of 10 micron and a BET surface area of 270 m²/g, was obtained from Euro Support B.V. (Amersfoort, NL). The powder was treated in air at 450° C. for 2 hours, cooled down to room temperature. The resulting powder is used as catalyst A.

Selective Oxidation

A 250 ml autoclave reactor equipped with a magnetically coupled stirrer, a gas manifold to supply metered amounts of a gas via two separate dip tubes, a back-pressure regulator, a wet gas test meter and an on-line gas chromatograph was used for the selective oxidation experiment. The autoclave was filled with 306 grams of solid sulphur and 20.3 grams of catalyst A. The autoclave was heated to 135° C. After 2 hours, the stirrer was started at 800 rpm. The vessel was pressurized to 40 bar g using a gaseous stream of 7 vol % $H_2S$ in methane which was fed via the dip tube below the liquid level. When the pressure level was reached, the feed gas flow (7 vol % $H_2S$ in methane) was adjusted to 4.2 Nl/h and a gaseous stream of 4 vol % $O_2$ in helium was added via a separate dip tube, also below the level of the liquid, at a rate of 6.0 Nl/h. The $O_2/H_2S$ ratio of the gases supplied to the autoclave was calculated as 0.82 mole/mole and the gas hourly velocity as 510 Nl/kg catalyst/h.

After 30 hours, the feed gas flow is increased to 6.0 Nl/h, which corresponds to an $O_2/H_2S$ ratio of 0.57.

After another 20 hours, the feed gas flow was decreased to 3.5 Nl/h corresponding to a gas hourly velocity of 475 Nl/kg/h and a $O_2/H_2S$ ratio of 0.98. After 72 hours, the experiment was stopped.

Samples of the gaseous effluent were taken before each change in feed gas flow and at the end of he experiment. The samples were analyzed using online gas chromatography (equipped with a pulsed discharge detector). The $H_2S$ and the methane conversion were calculated. The results are shown in the Table. The $CO_2$ concentration in the effluent samples was less than 50 ppmv, indicating that oxidation of methane is virtually zero.

Example 4 (According to the Invention)

Catalyst Preparation 273.6 grams of the ABS 50 powder (see EXAMPLE 3) was mixed with 64.1 grams of de-ionized water, 60 grams of a 5% wt aqueous solution of poly vinyl alcohol and 16 grams of ammonia (25%) to an extrudable dough with a solids content of 53.2 wt % and a pH of 9.5. This mix was extruded using a 1.6 mm diameter trilobe die-plate. The extrudates were dried at 120° C. and calcined at 550° C. for 2 hours and used as catalyst B.

Selective Oxidation

A reactor system was used for the selective oxidation experiment, the system comprising:

a reactor tube;

a gas manifold to supply metered amounts of gases via two separate feed lines to the reactor tube;

a gas-liquid separator directly downstream of the reactor tube a liquid recycle pump for recycling liquid from the gas-liquid separator to the reactor tube;

a liquid holding vessel that is connected to the liquid recycle system, from which liquid can be supplied to the reactor tube and to which liquid from the gas-liquid separator can be supplied; and a back-pressure controller in the vapour effluent line from the gas-liquid separator. The entire reactor system was mounted into an oven for temperature control.

2.0 grams of catalyst B were diluted with an equal volume of SiC and loaded into the reactor tube, which was subsequently mounted into the reactor system. Solid sulphur (70 grams) was added to the liquid holding vessel. The temperature of the reactor system was set at 135° C. After melting, the liquid sulphur was added to the bottom part of the gas-liquid separator and the reactor system was pressurized with a stream comprising 4 vol % $O_2$ in helium to 60 bar g. Then, the liquid sulphur was recycled over the catalyst bed and the sulphur flow was monitored by differential pressure measurement using a capillary calibrated with oil at ambient pressure before the experiment. Feed gas (7 vol % $H_2S$ in methane) and a gas comprising 4 vol % $O_2$ in helium were supplied to the reactor tube at flow rates of 1.60 Nl/h and 1.63 Nl/h, respectively. This corresponds to a total gas hourly velocity of 1610 Nl/kg/h and an oxygen/hydrogen sulphide ratio of 0.56.

After 20 hours, the pressure was increased to 90 bar g and the gas and liquid flows were adjusted to increase the total gas hourly velocity to 2250 Nl/kg/h while maintaining the same oxygen/hydrogen sulphide ratio and increase the ratio of gas/liquid flow rates.

After another 20 hours, the gas and liquid flows were adjusted to operate at an oxygen/hydrogen sulphide ratio of 1.22 and a total gas hourly velocity of 1590 Nl/kg/h.

Samples of the gaseous effluent were taken before each change in pressure or flow rates and at the end of the experiment. The samples were analyzed using online gas chromatography (equipped with a pulsed discharge detector). The $H_2S$ conversion was calculated. The results are shown in the Table.

TABLE

Process conditions and results of examples 2 to 4.

| example | | feed gas | $O_2/H_2S$ ratio | inert liquid medium | gas/liquid flow (Nl/kg) | p (bar g) | $H_2S$ conversion (%) | $CH_4$ conversion (%) |
|---|---|---|---|---|---|---|---|---|
| 2 | a | 15 vol % $H_2S$ in $CH_4$ | 0.5 | toluene | 300 | 30 | 98.2 | 0.02 |
|   | b | 15 vol % $H_2S$ in $CH_4$ | 0.5 | (continuous | 300 | 15 | 88 | <0.02 |
|   | c | 7 vol % $H_2S$ in $CH_4$ | 0.5 | supply | 300 | 90 | 99.8 | 0.01 |
|   | d | 15 vol % $H_2S$ in $H_2$ | 0.5 | without recycle) | 300 | 30 | 71 | n.a. |
| 3 | a | 7 vol % $H_2S$ in $CH_4$ | 0.82 | sulphur | n.a. | 40 | >99.9 | <0.01 |
|   | b | 7 vol % $H_2S$ in $CH_4$ | 0.57 | (batch) | n.a. | 40 | 85 | <0.01 |
|   | c | 7 vol % $H_2S$ in $CH_4$ | 0.98 |  | n.a. | 40 | 98.2 | <0.01 |
| 4 | a | 7 vol % $H_2S$ in $CH_4$ | 0.56 | sulphur | 100 | 60 | 21 |  |
|   | b | 7 vol % $H_2S$ in $CH_4$ | 0.55 | (continuous | 200 | 90 | 60 |  |
|   | c | 7 vol % $H_2S$ in $CH_4$ | 1.22 | supply with recycle) | 100 | 90 | 99.7 |  | n.a.: not applicable

We claim:

1. A process for the selective oxidation of hydrogen sulphide in a hydrogen sulphide containing feed gas to elemental sulphur, wherein the hydrogen sulphide containing feed gas, an inert liquid medium, and a molecular-oxygen containing gas are supplied to a reaction zone comprising a catalytic zone comprising an oxidation catalyst to form elemental sulphur and a gaseous stream depleted in hydrogen sulphide, in which process the oxidation catalyst of each catalytic zone is contacted with hydrogen sulphide and molecular-oxygen in the presence of inert liquid medium at a temperature in the range of from 120 to 160° C., under such conditions that the elemental sulphur formed is essentially in liquid form and is removed from the reaction zone with the inert liquid medium.

2. A process according to claim 1, wherein the reaction zone comprises a single catalytic zone of oxidation catalyst.

3. A process according to claim 1, wherein the reaction zone comprises at least two catalytic zones of oxidation catalyst in series.

4. A process according to claim 1, wherein the reaction zone further comprises catalytic zone A comprising a catalytic zone A oxidation catalyst comprising the oxide compound of the metal and a catalytic zone B oxidation catalyst comprising the sulphide compound of the metal, wherein:
   a) the hydrogen sulphide containing feed gas and inert liquid medium are supplied to catalytic zone A and contacted with the catalytic zone A oxidation catalyst of zone A to convert the metal oxide compound into its sulphide and to form a gaseous stream depleted in hydrogen sulphide; and
   b) the gaseous stream, air and inert liquid medium are supplied to catalytic zone B and contacted with the catalytic zone B oxidation catalyst of zone B to convert the metal sulphide compound into its oxide and to form elemental sulphur that is essentially in liquid form and is removed from catalytic zone B with the inert liquid medium.

5. A process according to claim 4, wherein the oxidation catalysts in zones A and B are each in the form of a fixed arrangement and the metal sulphide comprising oxidation catalyst formed in catalytic zone A is used as the oxidation catalyst in catalytic zone B and the metal oxide comprising oxidation catalyst formed in catalytic zone B is used as the oxidation catalyst in catalytic zone A, in a swing mode operation.

6. A process according to claim 4, wherein catalytic zones A and B are each in the form of a slurry-bubble column comprising a slurry of particles of the oxidation catalyst in the inert liquid medium, wherein slurry comprising metal oxide comprising oxidation catalyst particles, inert liquid medium and liquid sulphur is removed from zone B and, optionally after removal of sulphur, is supplied to zone A and slurry comprising metal sulphide comprising oxidation catalyst particles and inert liquid medium is removed from zone A and supplied to zone B.

7. A process according to claim 1, wherein the inert liquid medium is elemental sulphur.

8. A process according to claim 7, wherein the hydrogen sulphide containing feed gas comprises hydrogen sulphide in a concentration of from 0.5 to 50 volume %.

9. A process according to claim 8, wherein the hydrogen sulphide containing feed gas is contacted with the oxidation catalyst at a gas hourly velocity in the range of from 100 to 10,000 Nl/kg/h.

10. A process according to claim 9, wherein for each catalytic zone the ratio between gas and inert liquid medium supplied to the catalytic zone is in the range of from 10 to 10,000 Nl/kg.

11. A process according to claim 10, wherein the oxidation catalyst is selected from the group consisting of an oxide compound of a metal, sulphide compound of a metal, and both.

12. A process according to claim 11, wherein the molar ratio of oxygen and hydrogen sulphide supplied to the reaction zone is in the range of from 0.3 to 3.0:1.

13. A process according to claim 12, wherein the temperature in the catalytic zone(s) of oxidation catalyst is in the range of from 125 to 150° C.

14. A process according to claim 13, wherein the pressure in the catalytic zone(s) of oxidation catalyst is in the range of from 2 to 200 bar (absolute).

15. A process for the selective oxidation of hydrogen sulfide contained in a hydrogen sulfide containing feed gas to elemental sulfur, said process comprises:

introducing said hydrogen sulfide containing feed gas, an inert liquid medium and a molecular oxygen containing gas into a reaction zone comprising a catalytic zone comprising an oxidation catalyst;

contacting in the presence of said inert liquid medium said hydrogen sulfide of said hydrogen sulfide containing gas and molecular oxygen of said molecular oxygen containing gas with said oxidation catalyst, wherein the conditions within said catalytic zone include a temperature in the range of from 120 to 160° C., and wherein the conditions are such that the elemental sulfur formed is essentially in liquid form; and removing from said reaction zone an effluent comprising elemental sulfur and said inert liquid medium.

16. A process according to claim 15, wherein said inert liquid medium comprises elemental sulfur.

17. A process according to claim 16, wherein said hydrogen sulfide containing feed gas comprises hydrogen sulfide in a concentration in the range of from 0.5 to 50 volume percent.

18. A process according to claim 17, wherein said oxidation catalyst is selected from the group consisting of an oxide compound of iron, a sulfide compound of iron, a hydrated oxide compound of iron, and any combination of two or more thereof.

19. A process according to claim 18, wherein the molar ration of oxygen and hydrogen sulfide supplied to said reaction zone is in the range of from 0.3 to 3.0:1.

20. A process for the selective oxidation of hydrogen sulfide contained in a hydrogen sulfide containing feed gas to elemental sulfur, said process comprises:

introducing said hydrogen sulfide containing feed gas, an inert liquid medium and a molecular oxygen containing gas into a catalytic zone A comprising a catalytic zone A oxidation catalyst comprising a metal compound in the oxide form and contacting said hydrogen sulfide containing feed gas, said inert liquid medium, and said molecular oxygen containing gas with said catalytic zone A oxidation catalyst, wherein the conditions within said catalytic zone A include a temperature in the range of from 120 to 160° C. and the conditions are such that said metal compound in the oxide form of catalytic zone A is converted into the sulfide form;

yielding from said catalytic zone A a gaseous stream depleted in hydrogen sulfide;

introducing said gaseous stream, air and said inert liquid medium into a catalytic zone B comprising a catalytic zone B oxidation catalyst comprising a metal compound in the sulfide form and contacting said gaseous stream, said air and said inert liquid medium with catalytic zone B oxidation catalyst under conditions such that said metal compound in the sulfide form is converted into the oxide form, the contacting temperature is in the range of from 120 to 160° C., and the conditions are such that the elemental sulfur formed is essentially in liquid form; and removing from said catalytic zone B an effluent comprising elemental sulfur and said inert liquid medium.

21. A process according to claim 20, wherein said inert liquid medium comprises elemental sulfur.

22. A process according to claim 21, wherein said hydrogen sulfide containing feed gas comprises hydrogen sulfide in a concentration in the range of from 0.5 to 50 volume percent.

23. A process according to claim 22, wherein said catalytic zone A oxidation catalyst is selected from the group consisting of an oxide compound of iron or a hydrated oxide compound of iron or a combination thereof, and wherein said catalytic zone B oxidation catalyst is a sulfide compound of iron.

24. A process according to claim 23, wherein the molar ration of oxygen and hydrogen sulfide supplied to said reaction zone is in the range of from 0.3 to 3.0:1.

* * * * *